United States Patent
Robinson, III et al.

[15] 3,692,801
[45] Sept. 19, 1972

[54] 2-ALKYLIDENE OXETANE COMPOUNDS

[72] Inventors: Alfred G. Robinson, III, 501 W. Terrace Dr.; Anthony W. McCollum, 404 Hillmont, both of Longview, Tex. 75601

[22] Filed: Sept. 16, 1970

[21] Appl. No.: 72,839

[52] U.S. Cl..........260/333, 260/80.3 R, 260/88.3 A, 260/88.1 R, 260/488 F, 260/488 J, 260/594, 260/456 P
[51] Int. Cl.................................................C07d 3/00
[58] Field of Search........................................260/333

[56] References Cited

OTHER PUBLICATIONS

Chemical Abstracts, Subject Index, Vol. 68 (1968) p. 2676s
Robert et al., Basic Principles of Organic Chemistry (1964), p. 475.
Weissberger, A., Heterocyclic Compounds with Three and Four-Membered Rings, Part Two, (1964) pp. 1014, 1020, 1016.

*Primary Examiner*—Norma S. Milestone
*Attorney*—Cecil D. Quillen, Jr. and Daniel B. Reece, III

[57] ABSTRACT

Polymerizable unsaturated oxetane compounds having the structure:

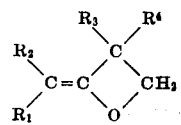

wherein $R^1$, $R^2$, $R^3$ and $R^4$ are selected from the group consisting of methyl or ethyl have been discovered. They may be prepared in high yield by reacting a suitable base, preferably potassium t-butoxide with a substituted 3-oxobutylene or 3-oxopentylene compound such as, for example, 2,2,4-trialkyl-3-oxopentyl tosylate or 2,2,4-trialkyl-3-oxopentyl isobutyrate in an inert organic solvent, preferably benzene. Polymers and copolymers are prepared from the oxetane compounds.

11 Claims, No Drawings

2-ALKYLIDENE OXETANE COMPOUNDS

This invention relates to novel unsaturated oxetanes and to a novel method for their preparation. More particularly, the invention is directed to 2-alkylidene oxetane compounds and to their preparation. In another aspect, the invention relates to the preparation of polymers of 2-alkylidene oxetane compounds.

The compounds of the invention may be represented by the following structure:

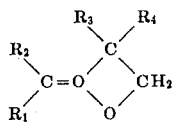

wherein $R^1$, $R^2$, $R^3$ and $R^4$ are methyl or ethyl radicals. $R^1$, $R^2$, $R^3$ and $R^4$ may be the same or different.

The isolation of alkenyl oxetanes has been recently described in the literature. Gotthardt, Steinimetz and Hammond reported in J. Org. Chem., 33 (7) 2774 (1968), the preparation of 3,3,4,4-tetramethyl-2-isopropenyl oxetane by the cycloaddition of tetramethylallene with acetone:

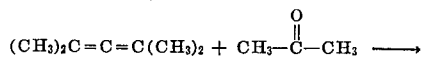

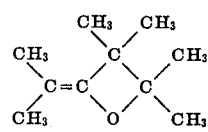

More recently, Crandall and Meyer have reported the synthesis of 1-methyl-3-methylene-2-oxabicyclo[2.2.0] hexane by photolysis of 5,6-heptadien-2-one:

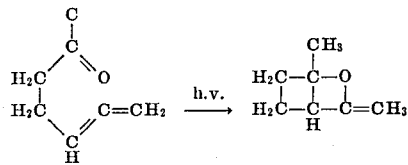

The compounds of the invention in contrast to these alkenyloxetanes are nonphotolytic and have not been heretofore reported nor have analogous syntheses of 2-alkenyl oxetanes, to our knowledge, appeared in the literature.

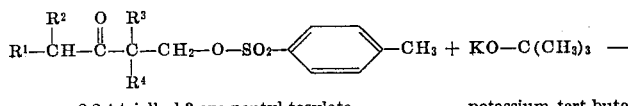

2,2,4-trialkyl-3-oxo-pentyl tosylate     potassium tert-butoxide

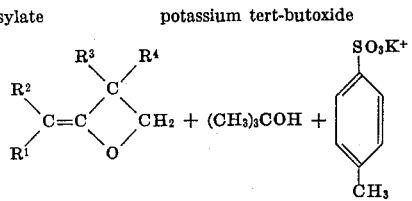

wherein $R^1$, $R^2$, $R^3$ and $R^4$ are as defined hereinabove.

The starting tosylate material may be prepared by any of the procedures well known to the art as, for instance, by reacting 2 moles of the monoisobutyrate ester of 2,2,4-trialkyl-1,3-pentanediol to produce isopropyl-1,1-dialkyl-2-hydroxyketone and reacting this ketone with p-toluenesulfonyl chloride. This synthesis can be represented by the following sequence of reactions:

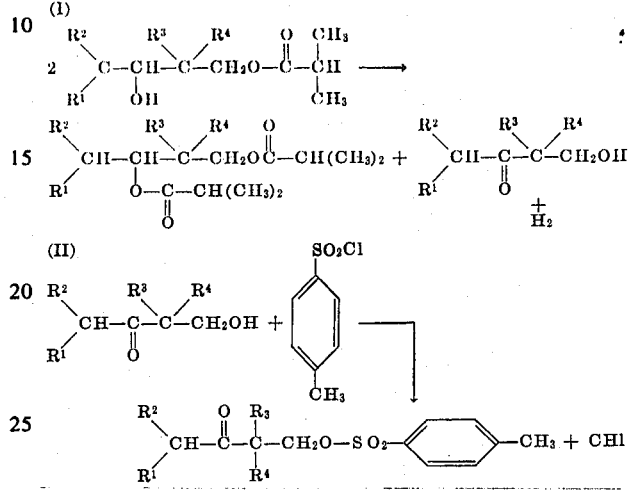

wherein $R^1$, $R^2$, $R^3$ and $R^4$ are defined hereinabove.

An alternate method for the preparation of the novel compounds of the invention comprises reacting 2,2,4-tri-lower alkyl-3-oxo-1-pentanol isobutyrate with a suitable base. The method will be illustrated in one of the working examples below.

Suitable bases with which the tosylate compound may be reacted include sodium methoxide, potassium tert-butoxide and sodium hydride. Not all of the alkali metal alkoxide class of bases provide the desired product or for that matter react at all. For instance, lithium methoxide and sodium hydroxide fail to react. The reaction is preferably effected by heating stoichiometric equivalents of the reactants to reaction temperature, ordinarily at least about 50°C. usually up to 170°C. Although the reaction can be carried out in the absence of a liquid reaction medium, it is advantageously carried out in the presence of an organic solvent. The use of a solvent facilitates contact between the reactants and aids in temperature control. The solvent should be inert, that is, should not react with the reactants or the product. Suitable solvents include, for example, alcohols such as methanol; aromatic hydrocarbons such as benzene, toluene, xylenes, ethylbenzene, dimethylformamide, dimethylacetamide, dimethylsulfoxide, etc. The preferred solvent is benzene and the preferred base potassium t-butoxide.

The novel compounds of the invention may be recovered from the reaction mixture by acidifying the mixture and pouring the acidified layer in water to form an aqueous layer and an organic layer. Any suitable acid may be used in this step. The aqueous layer is then extracted with chloroform and the organic layer washed, dried, filtered and distilled to obtain the desired oxetane product.

The unsaturated oxetane compounds may be homopolymerized or interpolymerized with at least one copolymerizable, ethylenically unsaturated monomer. Among the monomers with which the unsaturated compounds of the invention may be copolymerized are, for example, ethylenically unsaturated components such as ethylene, propylene, butene-1, butadiene, styrene, vinyl toluene, mono- and substituted styrenes such as monochlorostyrene, vinyl esters, acetylene, vinyl ethers, vinyl halides, vinylidene halides, acrylic and methacrylic acid and its derivatives, e.g., amides, esters, nitriles and the like. One such preferred copolymer is the copolymer prepared using styrene.

Polymerization of the oxetane compounds of the invention by themselves or with one or more comonomers can be carried out using polymerization processes known in the art such as anionic, cationic, coordination and free radical processes. Typical catalyst for cationic polymerization are Friedel-Crafts catalysts such as $AlCl_3$, $AlBr_3$, $TiCl_4$, $BF_3$, $SnCl_4$, $P_2O_5$, $SO_2$, $SbCl_5$, $FeCl$, $ZnBr$, $ZnCl$ and the strong Lewis acids such as trifluoro acetic acid. Examples of coordination catalysts which can be used include triethyl aluminum and titanium trialuminum. A co-catalyst may be required to initiate the polymerization. Any of the co-catalysts commonly employed in cationic polymerizations to supply $H^+$ may be employed for this purpose. Polymerization of the oxetanes of the invention is quite an exothermic reaction and extensive cooling is needed to avoid excessive temperatures. The polymerization temperature may vary widely depending upon the monomer or monomers selected for the polymerization but ordinarily falls in the range of about $-70°$ to $100°C$. Unless caution is exerted, temperatures much above $100°$ C. have a tendency to rupture the oxetane moiety and therefore are usually avoided when it is desired to preserve the oxetane moiety as part of the polymeric chain.

Thus, the polymerization of the novel compounds to form homopolymers and copolymers produces novel polymers having as a recurring oxetane unit:

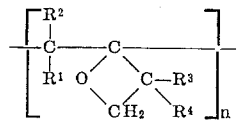

wherein $R^1$, $R^2$, $R^3$ and $R^4$ are as defined hereinabove and n is a number between 2 and 1,000, preferably 100 to 500.

An example of copolymers that may be prepared from the oxetane compounds of the invention are:

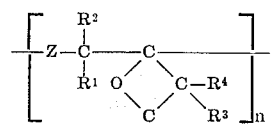

wherein $R^1$, $R^2$, $R^3$ and $R^4$ are as defined hereinabove, n is a number between 1 and 1,000, preferably 100 to 500, and Z is a polymerizable ethylenically unsaturated component as defined hereinabove. Preferably the copolymers of the invention contain 10 to 20 mole percent oxetane units. One such particular copolymer is the copolymers prepared from styrene and 2-alkylidene oxetane which can be represented as follows:

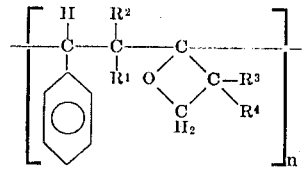

wherein $R^1$, $R^2$, $R^3$, $R^4$ and n are as defined hereinabove.

If desirable a chain terminator can be used such as, for example, hydrogen, to control the molecular weight of the oxetane copolymers. Also, pigments, stabilizers, anti-slip agents, anti-block agents, polymers such as polyethylene, polypropylene, polybutadiene, polystyrene and the like can be added or blended with the homopolymers and copolymers of this invention.

The polymers of the invention can be formed into films and fibers or molded into shaped objects. It should also be noted that the oxetane rings remain available on the polymeric chain for further crosslinking. Such crosslinking can be accomplished by any suitable means such as by heating the polymeric chain. The novel unsaturated oxetane compounds of the invention also find utility as chemical intermediates. It has been found that the unsaturated oxetane compounds containing the oxetane moiety undergo ring-opening in the presence of halogens to produce the corresponding 1,4-dihalogeno derivatives as may be represented by the following reaction:

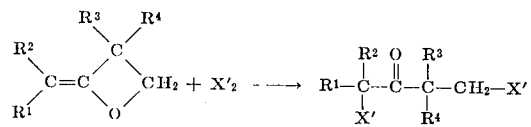

wherein again $R^1$, $R^2$, $R^3$ and $R^4$ are as defined hereinabove and $X'$ is a halogen atom, preferably bromine or chlorine. Thus, the unsaturated oxetane compounds offer a new route for the synthesis of $\alpha, \beta'$-dihaloketones.

The following examples are included to further illustrate the invention.

EXAMPLE 1 — PREPARATION OF 2-ISOPROPYLIDENE-3,3-DIMETHYLOXETANE

In a predried 1-liter flask is placed 900 ml. of benzene and 27 g. (0.21 mole) of potassium tert-butoxide powder. A solution of 70 g. (0.23 mole) of 2,2,4-trimethyl-3-oxopentyl tosylate, melting point 40°–42 °C., in 150 ml. of benzene is then introduced into the flask over a 5-minute period. The mixture is heated at reflux for 15 hours under a nitrogen atmosphere, cooled in ice, acidified to pH = 6 with acetic acid, and poured into water. The layers are separated and the aqueous layer is washed with saturated sodium bicarbonate solution and dried over anhydrous magnesium sulfate. After filtration and solvent removal, distillation of the residue gives 25 g. (91 percent) of oxetane, boiling point 91°C., 155 mm.; λCHCl₃ 2980, 1740, and 1,460 cm.⁻¹; nuclear magnetic resonance (CHCl₃) τ5.84 (s), 8.56 (s) and 8.67 (s).$^{max.}$

EXAMPLES 2–21

Example 1 is repeated employing the following reactants, solvents, reaction temperature and time shown in Table I wherein:

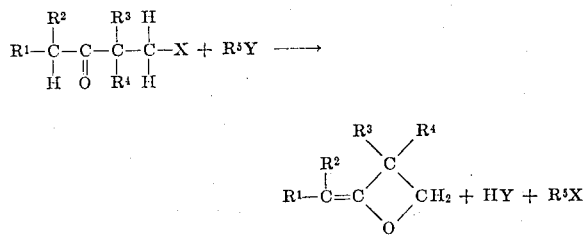

The invention has been described in considerable detail with particular reference to certain embodiments thereof, but it will be understood that variations and modifications can be effected within the spirit and scope of the invention as described hereinbefore. For example, hydrogen and certain alkyl radicals such as those from three to 10 carbon atoms in length may be substituted for the methyl or ethyl groups to give various useful homologs of the novel oxetane compounds.

We claim:

1. A compound having the structure:

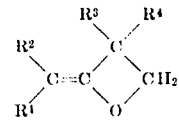

wherein $R^1$, $R^2$, $R^3$ and $R^4$ are each selected from the group consisting of methyl or ethyl.

TABLE I

| Ex. | R¹ | R² | R³ | R⁴ | X | R⁵ | Y | Solvent | Temp. (°C.) | Time (hr.) | Percent of oxetane product |
|---|---|---|---|---|---|---|---|---|---|---|---|
| 2 | Methyl | Methyl | Methyl | Methyl | —O—SO₂—C₆H₄—CH₃ | Na | —O—CH₃ | Methanol | 68 | 16 | 38 |
| 3 | do | do | do | do | Same as above | Na | —O—CH₃ | do | 68 | 40 | 75 |
| 4 | do | do | do | do | do | Na | —O—CH₃ | Benzene | 78 | 7 | 2.5 |
| 5 | do | do | do | do | do | Li | —O—CH₃ | Methanol | 68 | 65 | 0 |
| 6 | do | do | do | do | do | K | —O—C(CH₃)₃ | Benzene | 78 | 15 | 91 |
| 7 | do | do | do | do | do | K | —O—C(CH₃)₃ | do | 68 | 15 | 91 |
| 8 | do | do | do | do | do | K | —O—C(CH₃)₃ | do | 78 | 22 | 4 |
| 9 | do | do | do | do | do | Na | H | Dimethylformamide | 78 | 2 | 90 |
| 10 | do | do | do | do | do | Na | H | Dimethylsulfoxide | 170 | 1.5 | 89 |
| 11 | do | do | do | do | do | Na | OH | Methanol | 68 | 5 | 0 |
| 12 | do | do | do | do | —O—C(O)—CH(CH₃)₂ | Na | H | Benzene | 78 | 72 | 26 |
| 13 | do | do | do | do | Br | Na | H | do | 78 | 72 | 68 |
| 14 | do | do | do | do | Br | K | —O—C(CH₃)₃ | do | 78 | 15 | 62 |
| 15 | do | do | do | do | Cl | Na | H | do | 78 | 15 | 51 |
| 16 | do | do | do | do | Cl | K | —O—C(CH₃)₃ | do | 78 | 15 | 48 |
| 17 | do | do | do | do | —O—C(O)—CH(CH₃)₂ | Na | H | do | 78 | 15 | 26 |
| 18 | do | do | do | do | Same as above | K | —O—C(CH₃)₃ | do | 78 | 15 | 27 |
| 19 | do | do | do | do | —O—C(O)CH(CH₃)₂ | Na | —O—CH₃ | do | 78 | 15 | 19 |
| 20 | do | do | Ethyl | Ethyl | —O—SO₂—C₆H₄—CH₃ | Na | H | do | 78 | 15 | 10 |
| 21 | Ethyl | Ethyl | Methyl | Methyl | Same as above | Na | H | do | 78 | 15 | 52 |

EXAMPLE 22 — COPOLYMER OF STYRENE AND 2-ISOPROPYLIDENE-,3-DIMETHYLOXETANE

The purpose of the following example is to show that copolymers of 2-isopropylidene-3,3-dimethyloxetane and styrene can be made by cationic catalysts.

In a Pyrex test tube is placed 1.0 g. (8 milli Mole) of 2-isopropylidene-3,3-dimethyloxetane, 2.7 g. (0.026 mole) of styrene, and the reaction vessel is purged with nitrogen. Subsequent to cooling the tube to −75°C. in a dry ice-acetone bath a 1.0 g solution of titanium tetrachloride in 3 ml. of toluene is introduced by syringe. The mixture is stirred for 6 hours at −75°C. and allowed to sit at room temperature for 5 days. Methanol is added and a white precipitate formed. The precipitate is filtered, reprecipitated and dried to provide 2.7 g. of a styrene-oxetane copolymer. The NMR spectrum indicates 12 mole percent of oxetane units in copolymer with isopropylidene oxetane incorporated into polymer.

2. 2-Isopropylidene-3,3-dimethyloxetane.

3. A method for the preparation of a compound having the structure:

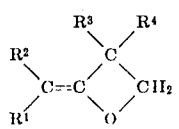

wherein $R^1$, $R^2$, $R^3$ and $R^4$ are each selected from the group consisting of methyl or ethyl, which comprises reacting a compound having the structure:

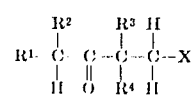

wherein

R¹, R², R³ and R⁴ are as defined hereinabove; and

X is selected from the group comprising tosylate, isobutyroxy, bromine and chlorine, with a base having the structure $$R^5Y$$

wherein

R⁵ is selected from the group comprising potassium and sodium, and

Y is a radical selected form the group comprising —OC(CH₃)₃—OCH₃ and H and recovering said compound from the resulting reaction mixture.

4. The method of claim 3 wherein the reaction is carried out in the presence of an inert solvent.

5. The method of claim 4 wherein the base is potassium tertiary butoxide and the inert solvent is benzene.

6. A method of producing 2-isopropylidene-3,3-dimethyloxetane which comprises reacting 2,2,4-trimethyl-3-oxopentyl tosylate with potassium tertiary butoxide in benzene as a reaction medium.

7. The method of claim 4 wherein the reaction is conducted at a temperature of about 50° to 170°C.

8. The method for the preparation of the compound of claim 1 which comprises reacting 2,2,4-tri-lower alkyl-3-oxopentylisobutyrate with a base selected from the group consisting of alkali metal tertiary butoxide, alkali metal hydride and sodium methoxide in the presence of an inert solvent and recovering the compound of claim 1 from the resulting mixture.

9. The method of claim 8 wherein the base is potassium tertiary butoxide and the inert solvent is benzene.

10. A method of producing 3,3-dimethyl-2-isopropenyloxetane which comprises reacting 2,2,4-trimethyl-3-oxopentyl isobutyrate with potassium tertiary butoxide in benzene as a reaction medium.

11. The method of claim 4 wherein the reaction is conducted at a temperature of about 68° to 78°C.

* * * * *

PO-1050
(5/69)

UNITED STATES PATENT OFFICE
CERTIFICATE OF CORRECTION

Patent No. 3,692,801          Dated November 14, 1972

Inventor(s) Alfred G. Robinson, III and Anthony W. McCollum

It is certified that error appears in the above-identified patent and that said Letters Patent are hereby corrected as shown below:

Column 1, lines 10-18, the formula should read:

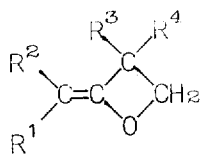

Column 1, lines 40-47, the formula should read:

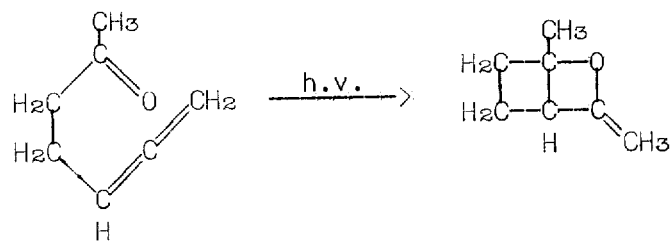

Column 3, line 16, delete "substituted" and insert ---poly-substituted---.

Column 3, line 30, delete "Zncl" and insert ---ZnCl---.

Column 5, line 51, delete "2-Isopropylidene-,3-Dimethyl-oxetane" and insert ---2-Isopropylidene-3,3-Dimethyloxetane---.

Column 5, line 54, delete "catalysts" and insert ---catalysis---.

Column 6, in the table, in the last heading, after "Percent", insert ---Yield---.

Signed and sealed this 6th day of March 1973.

(SEAL)
Attest:

EDWARD M. FLETCHER, JR.
Attesting Officer

ROBERT GOTTSCHALK
Commissioner of Patents